March 1, 1932. W. J. DE REAMER 1,848,004
APPARATUS FOR STACKING AND BUNCHING ARTICLES
Filed Jan. 21, 1929 3 Sheets-Sheet 1
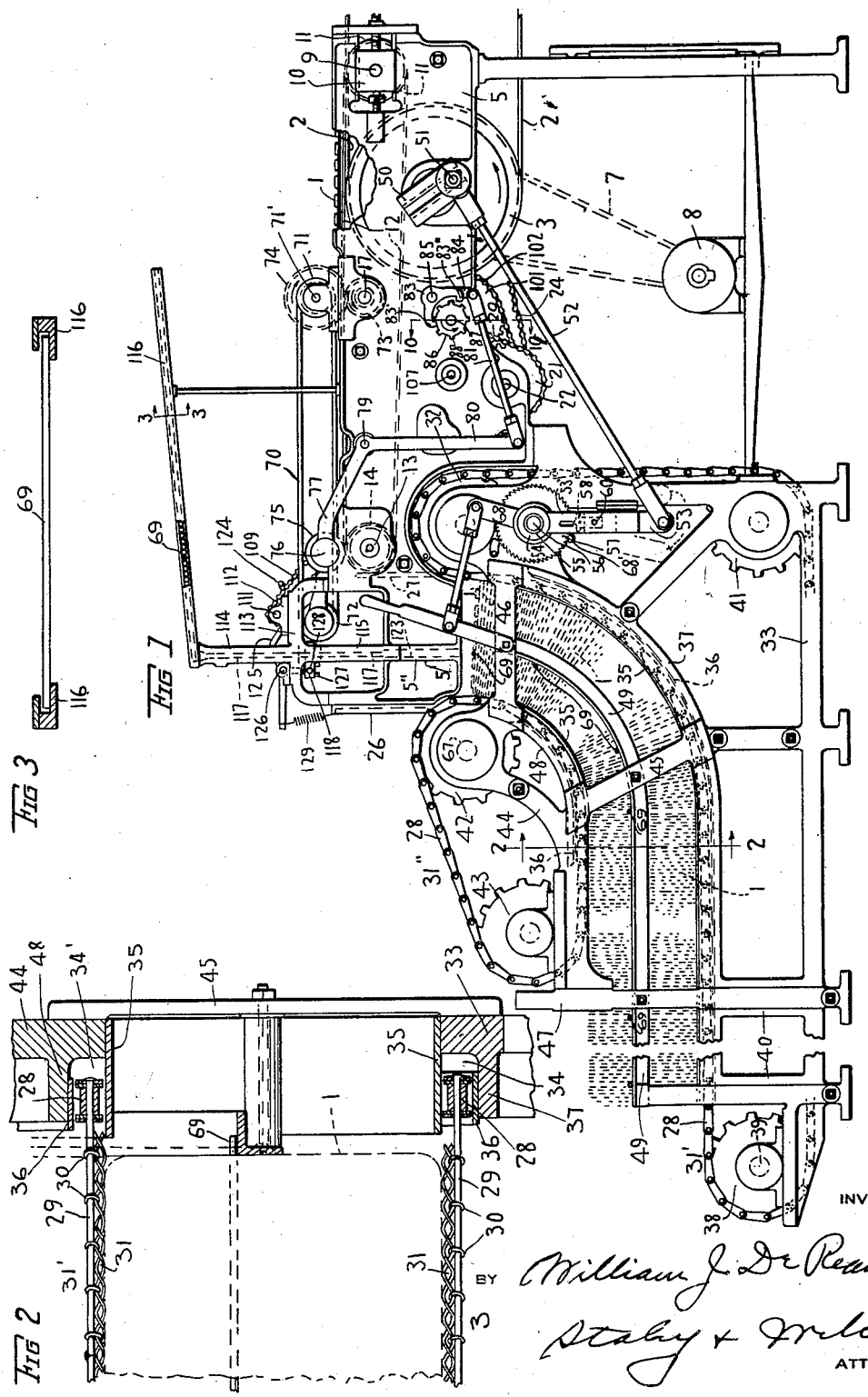
INVENTOR
William J. De Reamer
BY
Staley & Welch
ATTORNEYS March 1, 1932. W. J. DE REAMER 1,848,004
APPARATUS FOR STACKING AND BUNCHING ARTICLES
Filed Jan. 21, 1929  3 Sheets-Sheet 2
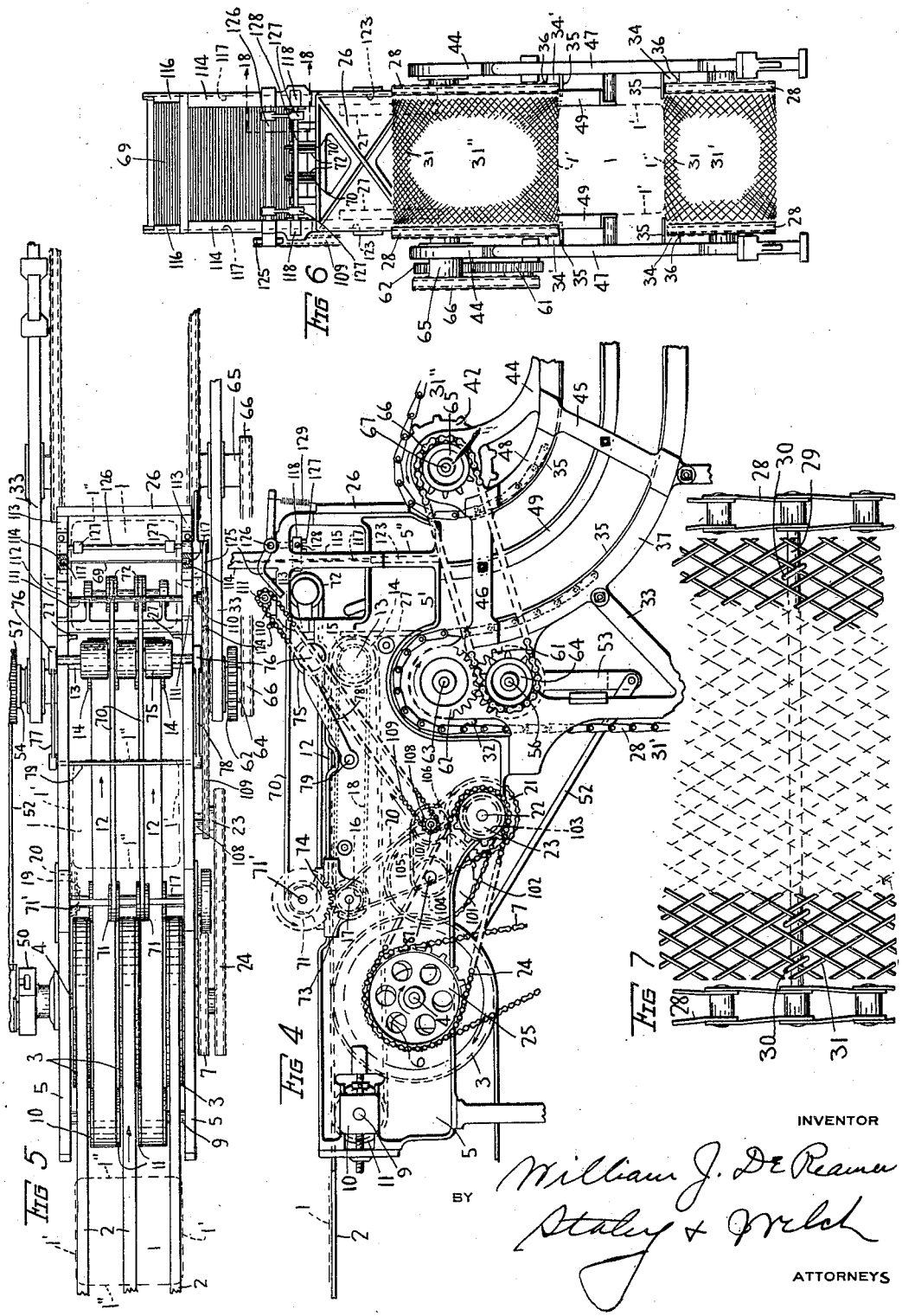
INVENTOR
William J. De Reamer
BY Staley & Welch
ATTORNEYS March 1, 1932. W. J. DE REAMER 1,848,004
APPARATUS FOR STACKING AND BUNCHING ARTICLES
Filed Jan. 21, 1929 3 Sheets-Sheet 3
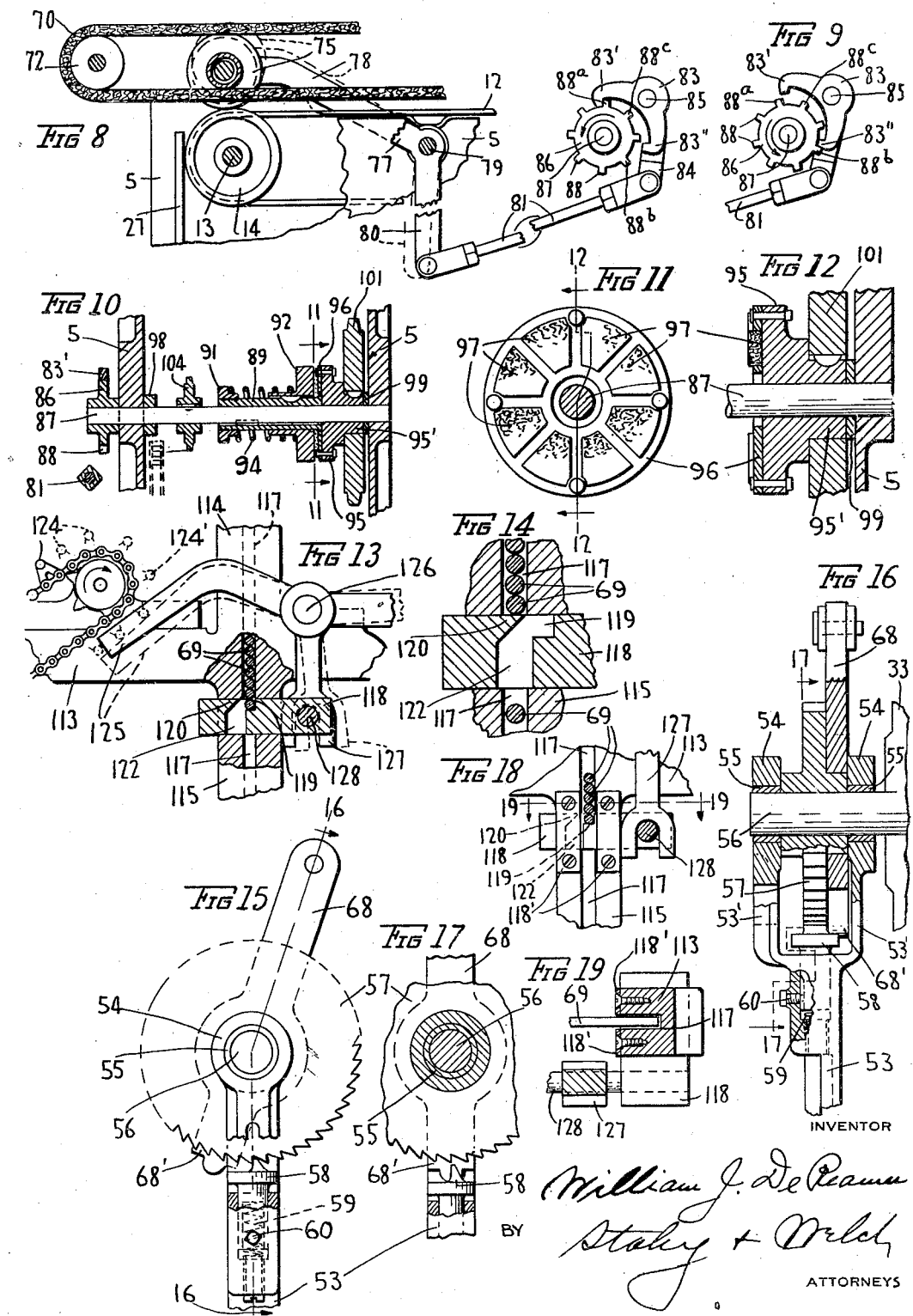

Patented Mar. 1, 1932

1,848,004

UNITED STATES PATENT OFFICE

WILLIAM J. DE REAMER, OF CROWN POINT, INDIANA, ASSIGNOR TO MAPES CONSOLIDATED MANUFACTURING COMPANY, OF GRIFFITH, INDIANA, A CORPORATION OF DELAWARE

APPARATUS FOR STACKING AND BUNCHING ARTICLES

Application filed January 21, 1929. Serial No. 333,855.

This invention relates to apparatus for stacking articles in bunches of predetermined numbers, it further relating to means for separating the bunches by automatically fed markers.

The object of the invention is to provide an apparatus of this character which will be simple in construction and effective in operation.

Other and more specific objects will appear from the accompanying description and claims.

The apparatus shown in the drawings is one particularly designed to handle what is known as egg case "flats", although it is to be understood that the apparatus is also applicable to the handling of other articles. These "flats" are molded from pulp and are for the purpose of forming bottoms for or division walls between the fillers of egg cases. These flats are molded by automatic devices, discharged onto an endless conveyer which passes through a drying oven and then discharged onto a second conveyer which carries them to baling apparatus where they are stacked, counted and baled. The work of stacking and counting has heretofore been performed manually and mentally by the workman and this operation when so performed has been so slow as to necessitate the cessation from time to time of the automatic molding and drying devices.

The improved apparatus is designed to stack and separate into bunches of predetermined numbers the articles as fast as they are discharged from the dryer and it consists of devices for feeding and stacking the articles in superimposed compact relation and also means for separating the stacked articles into bunches of a predetermined number by automatically feeding at predetermined times suitable markers to separate the bunches, the feeding of the markers being controlled by the feeding movement of the articles.

In the accompanying drawings:

Fig. 1 is a side elevation of a machine in which my improvements are embodied.

Fig. 2 is an enlarged vertical section on the line 2—2 of Fig. 1.

Fig. 3 is an enlarged section on the line 3—3 of Fig. 1.

Fig. 4 is a fragmentary side elevation, viewed from the opposite side to that shown in Fig. 1.

Fig. 5 is a partial top plan view.

Fig. 6 is a partial end elevation, the view being taken from the right hand end of Fig. 1.

Fig. 7 is an enlarged fragmentary plan view of a detail of the mechanism.

Fig. 8 is an enlarged elevation, partly in section of a portion of the mechanism.

Fig. 9 is an enlarged elevation of a portion of the mechanism, with the parts shown in a different position.

Fig. 10 is an enlarged sectional view on the line 10—10 of Fig. 1.

Fig. 11 is an enlarged section on the line 11—11 of Fig. 10.

Fig. 12 is an enlarged section on the line 12—12 of Fig. 11.

Fig. 13 is an enlarged elevation, viewed from the side as shown in Fig. 4 of portions of the mechanism shown in reduced scale in that figure.

Fig. 14 is an enlarged fragmentary vertical section, and is an enlargement of parts shown in Fig. 13, and in a different position.

Fig. 15 is an enlarged elevation, viewed from the side as shown in Fig. 1 of portions of the mechanism.

Fig. 16 is an enlarged section on the line 16—16 of Fig. 15.

Fig. 17 is an enlarged section on the line 17—17 of Fig. 16 and is similar to Fig. 15 but having some of the parts in a different working position.

Fig. 18 is an enlarged section on the line 18—18 of Fig. 6.

Fig. 19 is an enlarged section on the line 19—19 of Fig. 18.

Referring to the drawings, 1 represents the articles handled by the apparatus, which, in the present case, as before stated, are egg case flats. In the present case, the articles are fed to the apparatus in successive order by a series of endless conveyer belts 2, and when the articles handled are egg case flats these belts may preferably be the ones which receive the flats from the drying oven. But one end of this conveyer is shown in the drawings, this being the discharge end, 3 representing the pulleys about which these ends of the belts pass. These pulleys 3 may be journalled to run loosely but in the present case are secured by any means to a shaft 4 which in turn is journalled in each of the frame members 5—5. At one end of the shaft 4 is secured a sprocket 6 over which passes a chain 7 by which a motor 8 furnishes power for the operation of the machine.

From the belts 2 the articles are transferred to a second conveyer consisting of belts 12, passing over a series of pulleys 11, carried by a shaft 9 journalled in slidable bearing blocks 10, and also about similar pulleys 14 on a shaft 13, journalled in suitable bearings in the frame members 5. The belts are so placed that the upper runs of the belts 2 coincide with the upper run of the belts 12 to effect a ready transfer of the articles. Power is delivered to the pulleys 14 through the medium of a sprocket 15 secured to the shaft 13, sprocket 16 on a shaft 17, a chain 18, sprocket 19 on the shaft 17, chain 20, sprocket 21 on a shaft 22, and sprocket 23 connected by a chain 24 with a sprocket 25 on the main shaft 4. The belts 12 operate in the direction of the arrows as shown in Fig. 5, and articles placed thereon are conveyed to the proximity of the shaft 13, where, by reason of the momentum acquired they are projected against a guard 26 which also serves to secure the frame members together.

The articles after being arrested by the guard 26, drop flat-wise into the stacking devices now to be described. These devices comprise a chute-like arrangement, the mouth of which is defined by the downward extensions 5' of the frames 5 and the vertically extending ribs 27. Below the mouth two opposite walls of the chute are formed by flexible conveying devices, one of which is shown in enlarged detail in Fig. 7, in which it will be seen that a pair of chains 28 are held in spaced apart relation by rods 29 to which are secured by wire loops 30 a length of wire-mesh screen material 31. One of these conveyers 31' passes over sprockets 32 at the upper extension of frame members 33 which rest upon the floor and support the forward ends of the frame members 5, then downwardly through a curved channel 34 (see Fig. 2) formed by securing metallic plates 35 and 36 to the inside of the curved member 37 of each of the frames 33, and then over a sprocket 38 on a shaft 39 at the extreme forward end of the machine, it being understood that the length of the machine may be varied according to the number of extension frames 40 that are desired. The conveyer then returns to the original sprockets 32, sprocket 41 being placed at the lower rear point of the frames 33 for this purpose. A similarly constructed conveyer 31" is passed over sprockets 42 and 43 carried by the upper frame members 44, which are supported by the frame 33 by means of arms 45 and 46, and also by standards 47. There is also in each frame 44 similar curved channels 34' for the passage of the conveyer, the plates being secured to the curved member 48. The remaining sides of the chute are formed by the angle-section parts 49 which are seen secured to the standards 47, and to the arms 45 and 46, parts 49 being curved to conform to the curvature given to the members 37 and 48. These parts 49 act to maintain the flats in alignment during their passage through the chute to enable them to be compressed therein, and inasmuch as the flats are formed with cup-shaped raised portions on one side thereof to receive the eggs, it is essential that these raised portions on one flat should register with the corresponding depressions of an adjacent flat. These parts 49 also act to form supports and guides for the markers or spacers hereinafter described.

The direction of travel of the conveyers 31' and 31" is indicated by the arrows in Fig. 4, and the method of driving will be now explained. Referring to Fig. 1, a crank 50 to which is secured a pin 51 is keyed on shaft 4, one end of a connecting rod 52 being journalled on the pin 51 and the opposite end pivotally connected to a downwardly extending arm 53. The arm 53 is bifurcated at its upper end, as best seen in Fig. 16, each branch 53' terminating in bosses 54 in which are inserted bushings 55, which are loosely mounted on a horizontal shaft 56 which extends through and is journalled in bearings carried by the frame members 33, and at a point between the arms 53', a ratchet wheel 57 is secured to said shaft 56. A pawl 58 is slidably mounted in the arm 53, and is thrust upwardly against the wheel 57 by a coiled spring 59; the pawl being prevented from turning by means of a screw 60. From this it will be seen that as the shaft 4 is rotated, the crank-arm 50 transmits reciprocating motion to the arm 53, and thus advances the wheel 57 a certain portion of a revolution according to the degree of eccentricity to which the pin 51 is adjusted, the shaft 56 receiving motion in this manner.

At the opposite end of the shaft 56 is fixed a spur gear 61 mating with a similar gear 62 secured to the shaft 63 on which are fixed the sprockets 32. Also, on shaft 56 is secured one of a pair of sprockets 64 and 65, connected by a chain 66, sprocket 65 being secured to a shaft 67 carrying the sprockets 42 of the upper conveyer 31". Therefore it will be seen that the articles to be stacked, shown at 1 in broken lines in Figs. 1, 5 and 6, fall through the chute arrangement to the proximity of the conveying belts 31' and 31" and curved angular members 49, and when it is explained that the friction between the sides 1' of the articles 1 is maintained normally greater than the friction of the conveyers 31' and 31" on the sides 1", it will be seen that a compacting effect is produced on the series of articles, better illustrated in Fig. 1, and obviates to an extent the apparent necessity of an increased speed of travel of the lower conveyer 31' while it is passing through the curved channel 34. For the purpose of stopping the conveyers 31' and 31", with the remainder of the machine in operation, the pawl 58 is forced downwardly in its bore and maintained out of engagement with the teeth of the ratchet wheel 57, there being a lever 68 (see Figs. 1, 15, 16 and 17) journalled on a hub of the wheel 57, a lower arm 68' of which lever contacts with said pawl 58 and forces it out of engagement, as best shown in Fig. 17.

The devices for separating the stacked articles into bunches each of a predetermined number, will now be described. It has been found convenient to indicate to the operator by the presence of, in the present case, round rods 69, best seen in Figs. 1, 13 and 14, that between any two rods are a certain predetermined number of the articles.

As the articles are conveyed along by the belts 12, being guided and kept straightened by a pair of V-belts 70 which are run over pulleys 71 and 72, motion being given through the pinion 73 on shaft 17 and gear 74 on shaft 71', they must pass under a roller 75, rotatably mounted in the ends 76 of arms 77 and 78. These arms 77 and 78 are each secured to a common shaft 79 journalled in the frame members 5 and allow a substantially vertical swinging movement of the roller, which occurs when an article 1 passes under it. The arm 77 has a downward extending arm 80, to which at its lower end is pivotally connected one end of a connecting rod 81, the other end being connected to a double-armed escapement pawl 83 by means of a short lever 84. The escapement pawl 83 is therefore oscillated about its fulcrum pin 85 once for every article 1 that passes under the roller 75, and is so placed in engagement with an escapement wheel 86 on shaft 87 that extends through to the opposite side of the machine, that a step-by-step movement will be allowed the shaft as the articles pass under the roller 75, a complete revolution of the wheel 86 requiring as many articles to pass under the roller as there are teeth 88 in the wheel (Figs. 8 and 9).

Referring to Figs. 10, 11 and 12, the shaft 87 is seen to have keyed thereto a sleeve 89 having an adjustable threaded collar 91 at one end and slidably mounted on said sleeve but keyed to prevent rotation is a disk 92. A spring 94 is interposed between the disk 92 and collar 91. Rotatably mounted on shaft 87 is a second disk 95, to which is secured a spider or skeleton-like member 96, in the open sectors of which are placed segments 97 of a material similar for all purposes to materials used at the present time for clutch facings or brake band linings (see Figs. 11 and 12). The shaft 87 is held against longitudinal displacement by reason of the escapement wheel 86 at one end, and a collar 98 adjacent frame 5 and disk 95 bears against a collar 99 through its hub extension 95'. By securing sleeve 89 on shaft 87 at the proper point and adjusting spring collar 91 considerable pressure will be brought to bear on the segments 97 by the disk 92, so that when disk 96 rotates, it carries disk 92 along with it by the frictional engagement.

On the extended hub portion 95' of the disk 95 is a sprocket 101 over which a chain 102 passes, said chain also passing over a sprocket 103 on shaft 22. At another convenient point on shaft 87 is fixed a sprocket 104 connected by the chain 105 to a sprocket 106 on a shaft 107, at the near end of which (see Fig. 4) is secured a sprocket 108 connected by chain 109 to a similar sprocket 110 (see Figs. 4 and 13) this last sprocket being on a shaft 111 carried in bearings 112 on a pair of fixed yoke-shaped supporting members 113 secured to the frames 5 having upwardly and downwardly extending arms 114 and 115, respectively, in parallel relation with each other. At the upper end of the arms 114 is secured a sloping frame-work 116 adapted to receive the rods 69, said frame-work serving as a magazine for the rods (see Fig. 3). In the inner sides of arms 114 and 115 are vertical grooves 117 through which the ends of the rods 69 pass and are released at the proper time, singly, by the mechanism best shown in Figs. 13, 14, 18 and 19.

A pair of rectangular blocks 118 are fitted for reciprocative motion in the arms 115 in horizontal ways, and are each provided with a recessed portion 119 and when in position as shown in Fig. 13 an end of one rod will be deposited in the corresponding recess of each block. If the blocks 118 were to be placed in the position shown in Fig. 14, it will be seen that a lip 120 in the block 118 has been advanced under the lower rod of those retained in the arm 114, and the rod which was in the recess 119 in Fig. 13, has been moved and has fallen through the opening 122 in the block and on through the grooves in the lower arms 115, continuing its drop through grooves 123 in webs 5" until it drops clear on the uppermost of the flats 1, as indicated in Fig. 1. The blocks 118 are retained in their respective ways by plates 118', arranged vertically in pairs forming a continuation of the groove 117 and serve to remove the rod 69 from the recess 119 (see Fig. 18).

The position of the two blocks 118 in Fig. 13 may be termed the receiving position, since one rod 69 has dropped into the recess 119, while in Fig. 14 the release position is shown. The blocks 118 receive the ends only of the rods (see Fig. 19) and move from receiving to release position and return each in synchronism with each other, this being accomplished by the actuating means comprising a cam 124 attached to the chain 109 contacting with a lever 125 on a shaft 126, on which shaft is a pair of forked end levers 127. The forked ends of the levers 127 straddle a rod 128 which is passed through each of the blocks 118, with the result that downward pressure on the lever 125 moves the blocks to release position, Fig. 14 and the spring 129, receiving tension during this movement, acts to return the blocks to receiving position as soon as the cam 124 passes the end of the lever 125. The rod-like markers 69 after being deposited upon the flats are supported and guided by the horizontal portions of the parts 49, particularly as the flats and the rods pass through the curved portion and horizontal portion of the chute; otherwise, the rods might drop out of effective position in the flats.

During the operation of the machine, power is continuously applied to the disk 96 in which are the friction segments 97, and since there is frictional engagement of the segments 97 with the disk 92 there is a tendency to rotate said disk 92, but such rotation is not permitted by reason of the hooked end 83' being in positive engagement with one of the teeth 88ª of the escapement wheel 86, therefore the segments 97 must slip along the surface of the disks 92.

When, however, an article of sufficient height passes under the roller 75, the upward movement of which is indicated in broken lines in Fig. 8, sufficient oscillation is given to the double-arm pawl 83 to cause it to assume the position shown in Fig. 9, in which it is seen that the end 83' has moved out of engagement with the tooth 88ª the escapement wheel 86 will rotate, due to the continuously applied friction, but only partially since due to the proportioning of the levers, etc. further rotation is arrested by the contact of the arm 83'' with tooth 88ᵇ. When the article passes from beneath the roller 75, it drops again to the position as shown in the full lines 75 in Fig. 8, the arm 83'' moves from engagement with tooth 88ᵇ, while arm 83' at once catches tooth 88ᶜ, and a further partial rotation of the escapement wheel 86 is permitted, and as before mentioned, one complete revolution thereof requires the lifting the roller 75 as many times as there are teeth in the escapement wheel 86. The cam 124 is successively advanced toward contact with the arm 125 by the successive passage of articles under the roller 75, and with proper timing, the position of cam at the point indicated by the dotted line 124' is that position from which one additional rise of the roller 75 will release one rod.

Having thus described my invention, I claim:

1. In an apparatus of the character described, mechanism for stacking articles in superimposed relation, and devices for automatically separating said articles into bunches each of a predetermined number comprising temporary markers and devices controlled by the articles for releasing the markers one-by-one and permitting them to drop by gravity upon the articles.

2. In an apparatus of the character described, mechanism for stacking articles in superimposed relation and devices for automatically separating said stacked articles into bunches each of a predetermined number comprising temporary markers of a rod-like character and devices controlled by the articles for releasing said markers one-by-one at predetermined intervals and permitting them to drop by gravity upon said articles.

3. In an apparatus of the character described mechanism for stacking articles in superimposed relation including feeding devices for feeding said articles in successive order, a magazine for individual markers including means at the discharge end of said magazine for permitting the discharge of said markers one by one, and devices controlled by the articles for operating said releasing means after a predetermined number of articles have been fed.

4. In an apparatus of the character described, feeding devices for feeding articles in successive order, a stacking compartment at the discharge end of said feeding devices, a magazine for markers having a discharge end arranged in proximity to the discharge end of said feeding devices, and devices controlled by said articles for releasing markers one by one from said magazine after a predetermined number of articles have been fed.

5. In an apparatus of the character described, feeding devices for feeding articles in successive order, a stacking compartment arranged at the discharge end of said feeding devices, a magazine for individual markers of a rod-like character having its discharge end located in proximity to the discharge end of said feeding devices, and devices operated by the articles travelling on said feeding devices for releasing a marker from said magazine after a predetermined number of articles have been fed.

6. In an apparatus of the character described, feeding devices for feeding articles in successive order in a horizontal direction, a stacking mechanism to receive the articles fed by said feeding devices, a magazine for markers having its discharge end arranged at a point between the discharge end of said feeding devices and said stacking mechanism, and means for releasing a marker from said magazine after a predetermined number of articles have been fed to said stacking mechanism, said releasing means including a movable device located at the discharge end of said magazine having a pocket for a single marker and a cut off for the markers above said pocket.

7. In an apparatus of the character described, feeding devices for feeding articles in successive order in a horizontal direction, a stacking mechanism to receive the articles from said feeding devices comprising a chute-like structure having a vertical portion arranged at the discharge end of said feeding device and terminating in a horizontal portion together with means for feeding the articles therethrough, a magazine for markers having a discharge end arranged above the vertical portion of said chute-like structure, and means controlled by the articles for releasing a marker from said magazine after a predetermined number of articles have been fed to said chute structure.

8. In an apparatus of the character described, feeding devices for feeding articles, stacking mechanism to receive the articles fed by said feeding devices, a magazine for markers of a rod-like character having its discharge end arranged at a point in proximity to the entrance of said stacking mechanism, said magazine having guides for the ends of said markers leading to the discharge portion thereof to allow the markers to be fed therethrough in successive order, a member at the discharge end of said magazine constructed to receive and release one rod at a time, and means controlled by a predetermined number of articles on said feeding devices for operating said member.

9. In an apparatus of the character described, mechanism for stacking articles in superimposed relation, and devices for feeding markers to said stacked articles to separate the stacks into bunches of predetermined numbers, said devices including a movable feed member for feeding said articles one by one, power-operated means for moving said feed member, and an escapement controlled by the articles for permitting an intermittent movement of said power-operated means.

10. In an apparatus of the character described, mechanism for stacking articles in superimposed relation, a magazine for markers, and devices for releasing said markers one by one to separate the stacked articles into bunches of a predetermined number including a slidable feed member at the discharge end of the magazine, a cam lever connected therewith, a movable cam cooperating with said cam lever, power means for moving said cam, and an escapement for said power means controlled by the articles.

11. In an apparatus of the character described, mechanism for stacking articles in superimposed relation, and devices for feeding markers to the stacked articles to separate the same into bunches of a predetermined number including a magazine for the markers, a movable feed device at the discharge end of said magazine, power-operated means for moving said feed device comprising continuously operated members and intermittently operated members together with a friction clutch connecting the same, and an escapement controlled by the articles associated with the intermittently operated members.

12. In an apparatus of the character described, mechanism for stacking articles in superimposed relation, and devices for automatically separating said stacked articles into bunches each of a predetermined number comprising a magazine for rod-like markers, a slidable feed member at the discharge end of said magazine adapted to permit the discharge of said markers one by one, a cam lever connected with said feed members, an endless chain having a cam cooperating with said cam lever, a shaft having an operative connection with said chain, an escapement associated with said shaft controlled by said articles, a continuously operating member, and a permanently engaged friction clutch between said shaft and operating member.

13. In an apparatus of the character described, mechanism for stacking articles in superimposed relation, an endless feeding device leading to said mechanism arranged to feed articles thereto in successive order, a magazine for markers, and means for feeding markers from said magazine comprising power-operated feed devices having an escapement, a pivoted lever having a roller arranged in proximity to the article feeding device so as to be rocked by the articles passing over said feeding device, and a connection between said lever and said escapement.

14. In an apparatus of the character described, an endless feeding device for feeding articles in successive order, mechanism for stacking articles in superimposed relation arranged at the discharge end of said feeding device, and means for automatically feeding markers to the stacked articles including a rotatable shaft, a continuously operating member, a permanently engaged friction clutch connecting said shaft and member, a toothed wheel on said shaft, a pivoted double pawl associated with said wheel, a pivoted lever associated with said article feeding device having its free end arranged in the path of said articles, and a connection between said lever and said pawl.

15. In an apparatus of the character described, a stacking mechanism of chute-like form to receive articles, said stacking mechanism including two movable opposed surfaces, means for depositing markers at predetermined intervals among said articles, and supports for said markers extending throughout the length of the chute.

16. In an apparatus of the character described, a stacking mechanism of chute-like form to receive articles, said stacking mechanism including two movable opposed surfaces, means for depositing markers at predetermined intervals among said articles, and supports for said markers extending throughout the length of the chute, said supports being in opposed relation at the sides of the chute between the movable surfaces.

In testimony whereof, I have hereunto set my hand this 9th day of January, 1929.

WILLIAM J. DE REAMER.